United States Patent

Kluitmans et al.

Patent Number: 5,267,074
Date of Patent: Nov. 30, 1993

[54] COHERENT OPTICAL HETERODYNE TRANSMISSION SYSTEM

[75] Inventors: Johannes T. M. Kluitmans; Pieter W. Hooijmans; Abram Van De Grijp, all of Eindhoven, Netherlands

[73] Assignee: U.S. Philips Corporation, New York, N.Y.

[21] Appl. No.: 942,124

[22] Filed: Sep. 8, 1992

Related U.S. Application Data

[63] Continuation of Ser. No. 642,493, Jan. 17, 1991, abandoned.

[30] Foreign Application Priority Data

Jan. 22, 1990 [NL] Netherlands ............... 9000149

[51] Int. Cl.⁵ .............. H04B 10/00; H04B 10/06; H04B 10/04
[52] U.S. Cl. .................. 359/191; 359/152; 359/192; 359/195; 359/181
[58] Field of Search ............... 359/152, 181, 182, 188, 359/191, 192, 180, 189, 195

[56] References Cited

U.S. PATENT DOCUMENTS

| | | | |
|---|---|---|---|
| 3,573,463 | 5/1971 | Goodwin et al. | 359/114 |
| 4,704,741 | 11/1987 | Shikada | 455/606 |
| 4,777,664 | 10/1988 | Khoe | 359/190 |
| 4,817,206 | 5/1989 | Calvani et al. | 359/181 |
| 4,965,857 | 10/1990 | Auracher et al. | 359/158 |

FOREIGN PATENT DOCUMENTS

| | | |
|---|---|---|
| 0354567 | 2/1490 | European Pat. Off. |
| 0319242 | 6/1989 | European Pat. Off. |
| 59-216335 | 12/1984 | Japan |

OTHER PUBLICATIONS

Okoshi et al, "Computation of Bit-Error Rate of Various Heterodyne and Coherent-Type Optical Communication Schemes", J of Optical Communications 2(1981)3, 89-96.

Primary Examiner—Richard E. Chilcot, Jr.
Assistant Examiner—Rafael Bacares
Attorney, Agent, or Firm—Anne E. Barschall

[57] ABSTRACT

A bidirectional coherent optical transmission system comprises two stations (I and II) each having only a single laser (2, 9), part of the light signal generated by the laser being fed to a glass fibre T and another part of the light signal generated by the laser being used for mixing the received light signal down to an intermediate frequency by means of a photoelectric diode (4, 11). In contradistinction to the prior art transmission system, in the system according to the invention the light signal is modulated by applying a modulation signal to each of the lasers (2, 9).

8 Claims, 2 Drawing Sheets

COHERENT OPTICAL HETERODYNE TRANSMISSION SYSTEM

This is a continuation of application Ser. No. 07/642,493, filed Jan. 17, 1991 now abandoned.

BACKGROUND OF THE INVENTION

1. Field of the Invention

The invention relates to a coherent optical heterodyne transmission system comprising at least a first and a second station interconnected by means of a glass fibre, each station comprising an electrooptical converter, an optoelectrical converter and optical coupling means coupling the optoelectrical converter to the glass fibre and which optical coupling means likewise feed a first portion of the light generated by the electrooptical converter to the optoelectrical converter and a second portion of the light generated by the electrooptical converter to the glass fibre; each station comprising modulation means for modulating with an electric modulation signal the light fed to the glass fibre.

The invention likewise relates to a station to be used in a transmission system of this type.

2. Related Art

A transmission system according to the opening paragraph is disclosed in European patent application No. 354,567.

To enable transport of a baseband signal through a glass fibre, in coherent optical transmission systems the baseband signal can amplitude modulate the light signal coming from an electrooptical converter, phase modulate it or frequency modulate it before feeding the light signal to the glass fibre.

To enable demodulation of the light signals at a station with the aid of commercially available electronic components it is necessary to convert the light signal that has a very high frequency (e.g. $10^{14}$ Hz) to a light signal having a much lower intermediate frequency of e.g. $10^9$ Hz. For this purpose the received signal is mixed in the receiver with the aid of an optoelectrical converter with a local light signal generated by an electrooptical converter. This establishes an electrical intermediate frequency signal having a frequency equal to the differential frequency between the frequency of the received light signal and the frequency of the local light signal.

Without further measures being taken each station would need 2 electrooptical converters for enabling full-duplex transmission, that is, one in each station for generating the light signal to be transmitted and one in each station for generating the local light signal.

In the known transmission system each station comprises no more than a single electrooptical converter for generating both the light signal to be transmitted and the local light signal. A combined light signal is obtained by combining in each station by means of optical coupling means part of the light generated by the optoelectrical converter with the received light signal. By feeding this combined light signal to an optoelectrical converter the intermediate-frequency signal is obtained. In this respect it is necessary that the absolute value of the frequency difference between the light signals generated by the two electrooptical converters be equal to the intermediate frequency.

In the known receiver the second portion of the light generated by the optoelectrical converter fed to the glass fibre is modulated by means of an optical modulator included in the optical coupling means. Such a modulator is expensive and causes considerable attenuation of the light sent through it.

SUMMARY OF THE INVENTION

It is an object of the invention to provide a transmission system according to the opening paragraph in which the use of an optical modulator can be dispensed with. Therefore, the invention is characterized in that the modulating means for modulating with an electric modulation signal the light fed to the glass fibre comprises control means of the electrooptical converter.

The invention is based on the understanding that the light generated by the electrooptical converter can be modulated by applying a suitable electric modulation signal to the electrooptical converter.

Because the light signals generated by the two electrooptical converters are being modulated, the intermediate-frequency signal of each station contains both the signal transmitted by the station concerned and the signal received by the station concerned. It may then happen that the spectra of the two signals overlap so that they are made inseparable.

An embodiment of the invention in which the spectra of the two signals do not overlap is characterized in that at least either of the two stations comprises means for obtaining the modulation signal by modulating a baseband signal on a subcarrier.

Because the spectra of the two modulation signals do not overlap they can be separated by means of simple filters.

In order to minimize the signal loss during the mixing of the local light signal with the light signal received by a station, it is necessary that the polarization direction of the received light signal and the polarization direction of the local light signal are equal. Generally, however, the polarization direction of the received light signal is indefinite and not constant with time. Without any precautions being taken, the amplitude of the intermediate-frequency signal may vary between a maximum value (when the two polarization directions are equal) and virtually zero (when the polarization directions are orthogonal). This problem can generally be solved by introducing polarization control means in each station, turning the polarization direction of the received signal in such a way that this polarization direction coincides with the polarization direction of the local light signal.

A further embodiment of the invention is characterized in that the optical coupling means retains the polarization direction and in that polarization direction control means are included only in the first station between the glass fibre and the optical coupling means.

Since there are only two electrooptical converters present, it will be sufficient for the first station to comprise means for adjusting the polarization direction so as to equalize the polarization directions of the light signals generated by the two electrooptical converters. However, the polarization direction of the light signals in the optical coupling means should be retained.

A further embodiment of the invention is characterized in that only the first station comprises frequency control means 303 for establishing the frequency of the light signal generated by the electrooptical converter on the basis of the frequency of the received light signal and a desired value of a differential frequency. Because only the frequency difference between the two light signals needs to be established, a frequency control circuit in only either of the stations will suffice.

If both the frequency and the polarization direction control means 302 are arranged in the first station, the second station may be of a very simple structure. The first station may serve as the main station for further stations of a simpler structure (subscribers).

Since all control signals and modulation signals are available in the main station, the behavior of the whole system can be monitored and controlled from a central point.

The system described can also be used in a half-duplex mode in which only one electrooptical converter is modulated. The latter then has the disposal of the complete intermediate frequency bandwidth for transmission at a higher bit rate.

BRIEF DESCRIPTION OF THE DRAWING

The invention will now be described with reference to the drawings Figures in which.

DETAILED DESCRIPTION OF THE PREFERRED EMBODIMENTS

Figure 1:
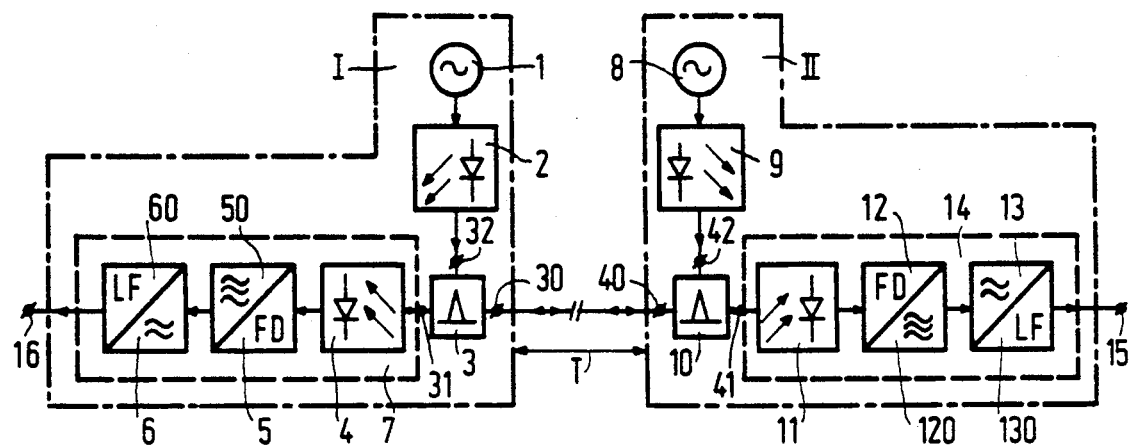
FIG. 1 shows an embodiment of the optical transmission system according to the invention.

In the coherent optical heterodyne transmission system as shown in FIG. 1, I is the first station and II the second station. The first station I comprises an electrooptical converter being a laser 2 whose control means is connected to a signal source 1 and whose output is connected to a connection point 32 of the optical coupling means 3. The connection point 30 of the optical coupling means 3 is connected to a monomode glass fibre T. The connection point 31 of the optical coupling means 3 is connected to the input of an optoelectrical converter being a photoelectric diode 4, whose output is connected to the input of a low-frequency unit 6 via a band-pass filter 5. The second station II comprises an electrooptical converter being a laser 9 whose control means is connected to a signal source 8 and whose output is connected to the connection point 42 of the optical coupling means 10. The connection point 40 of the optical coupling means 10 is connected to the monomode glass fibre T. The connection point 41 is connected to the input of an electrooptical converter being a photoelectric diode 11 whose output is connected to the input of a low-frequency unit 13 via a filter 12. The combination of the photoelectric diode 4, band-pass filter 5 and the low-frequency unit 6 constitutes the optical receive section 7 of the station I. The combination of the photoelectric diode 11, bandpass filter 12 and the low-frequency unit 13 constitutes the optical receive section 14 of the second station II. The operation of the optical transmission system according to the invention is as follows.

The laser 2 generates a first optical carrier having a frequency F(01) GHz. This optical carrier is FM modulated by means of the electric signal source 1. The optical signal thus obtained satisfies the equation:

$$F(1) = F(01) \cdot \{1 + m(1) \cdot V(1)\} \ldots \quad (1).$$

In this equation F(1) is the optical frequency occurring at the output of the laser (2), m(1) the modulation depth and V(1) the electric voltage supplied by the electric signal source (1).

The laser 9 generates a second optical carrier having a frequency F(02) GHz. This optical source 8. The optical signal thus obtained satisfies the equation:

$$F(2) = F(02) \cdot \{1 + m(2) \cdot V(2)\} \ldots \quad (2).$$

In this equation F(2) is the optical frequency occurring at the output of the laser 9, m(2) the modulation depth and V(2) the electric voltage supplied by the electric signal source 8.

The optical signals according to equations (1) and (2) are applied to the inputs 32 and 42 of the respective optical coupling means 3 and 10. Part of the optical signal according to equation (1) is transmitted to the receiver 14 of station II as a send signal through the monomode glass fibre T. Another part of the optical signal according to the equation (1) is transmitted to the receiver 7 of station I. Part of the optical signal according to equation (2) is transmitted to the receiver 7 of station I as a send signal through the monomode glass fibre T. Another part of the optical signal according to equation (2) is transmitted to the receiver 14 of station II.

The frequency difference between the two optical signals is selected to be equal to the intermediate frequency F of the two receivers 7 and 14. Thus the following equation will hold:

$$\Delta F = |F(1) - F(2) - \ldots \quad (3).$$

Because the two optical signals F(1) and F(2) are frequency-modulated signals, the intermediate-frequency signal ΔF in both receivers has the modulation of the two lasers according to:

$$\Delta F = F(1) - F(2) + F(1)m(1) \cdot V(1) - F(2) \cdot m(2).After$$

FM detection by means of the two frequency discriminators 5 and 12 this discriminator output after filtering becomes equal to:

$$V(out) = a \cdot F(1) \cdot m(1) \cdot V(1) - a \cdot F(2) \cdot m(2) \cdot V(2) \ldots \quad (5).$$

Figure 2:
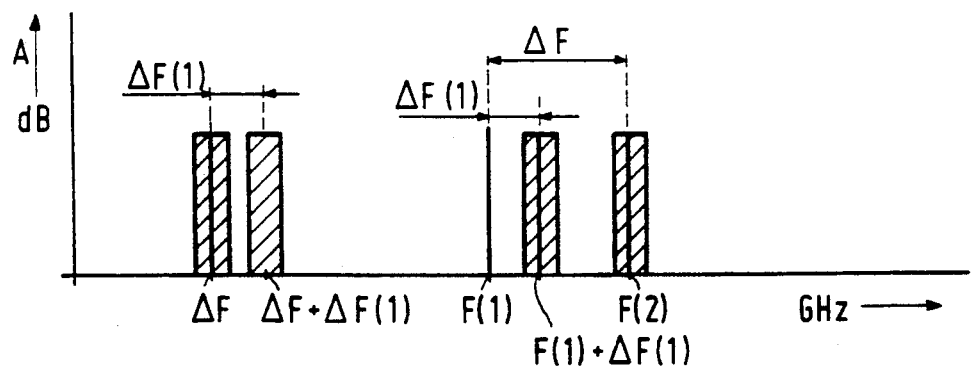
FIG. 2 shows a frequency diagram to explain the operation of the optical transmission system as shown in FIG. 1.
Figure 3:
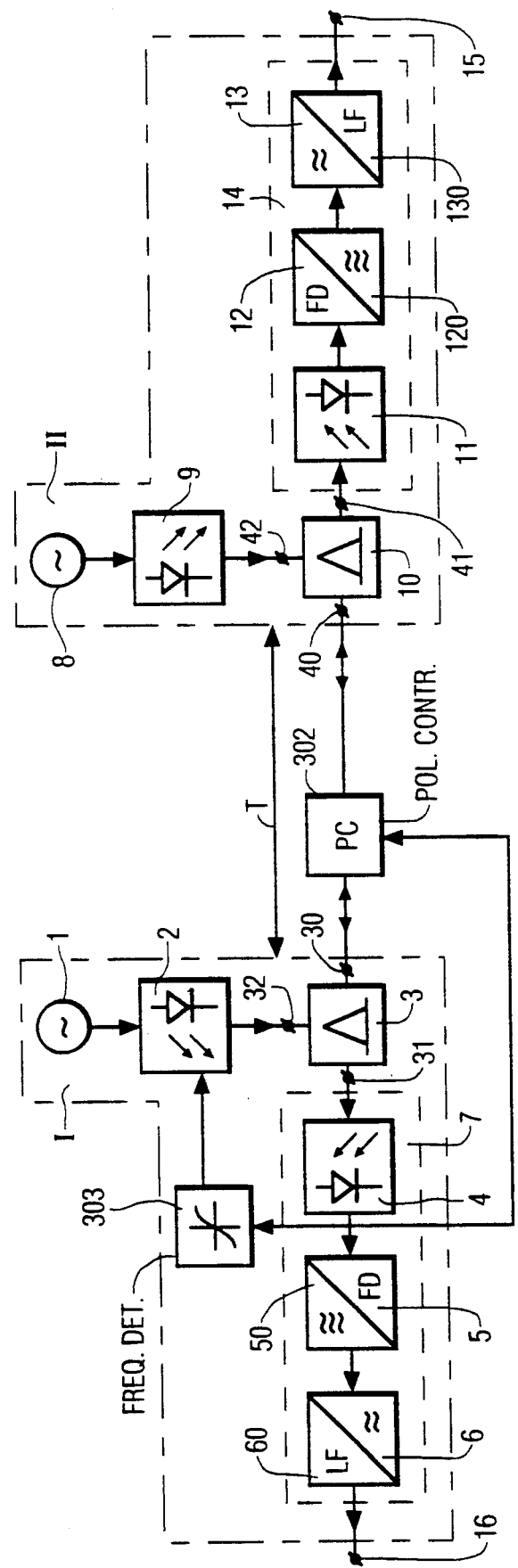
FIG. 3 shows an alternate embodiment of the circuit of FIG. 1A.

The output of the two discriminators is thus equal to the sum of the two modulation signals. In order to avoid the two modulation signals becoming inseparable, at least either of the two baseband signals can, according to the inventive idea, be modulated on a subcarrier. In the exemplary embodiment according to FIG. 2 the baseband signal in station 1 is modulated on a subcarrier that has a frequency F(1). This is represented in FIG. 2. Filtering is effected by means of the respective band-pass filters 50 and 120. By means of filters 6 and 13 the desired modulation component is filtered and subsequently amplified at a low frequency.

We claim:

1. Coherent optical heterodyne transmission system comprising
  at least a first and a second transceiving station interconnected by means of a glass fibre, each respective station comprising
    no more than a single electrooptical converter, the electrooptical converter acting as transmitter and local oscillator for the respective station.
    an optoelectrical converter,
    optical coupling means coupling the optoelectrical converter to the glass fibre, which optical coupling means likewise feed a first portion of the light generated by the electrooptical converter to the optoelectrical converter and a second portion of the light generated by the electrooptical converter to the glass fibre; and modulation means, for modulating with an electrical modulation signal, the light fed to the glass fibre, the modulation means comprising control means for controlling the electrooptical converter in response to the electrical modulation signal, whereby an optical modulator is not necessary, wherein at least one of the first and second stations comprises means for obtaining the electrical modulation signal by modulating a baseband signal on a subcarrier, whereby transmitted and received modulation signals are distinguishable in the IF section of the station containing the means for obtaining.

2. Transmission system as claimed in claim 1, characterized in that the optical coupling means retains the polarization direction and in that polarization direction control means are included only in the first station between the glass fibre and the optical coupling means.

3. Transmission system as claimed in claim 1, characterized in that only the first station comprises frequency control means for establishing the frequency of the light signal generated by the electrooptical converter on the basis of the frequency of the received light signal and a desired value of a differential frequency.

4. Transmission system as claimed in claim 2, characterized in that only the first station comprises frequency control means for establishing the frequency of the light signal generated by the electrooptical converter on the basis of the frequency of the received light signal and a desired value of a differential frequency.

5. A transceiving station for use in a coherent optical heterodyne transmission system, the station comprising
no more than a single electrooptical converter, the electrooptical converter acting as transmitter and local oscillator for the station,
an optoelectrical converter,
optical coupling means coupling the optoelectrical converter to a glass fibre, which optical coupling means likewise feeds a first portion of the light generated by the electrooptical converter to the optoelectrical converter and a second portion of the light generated by the electrooptical converter to the glass fibre;

modulation means, for modulating with an electrical modulation signal, the light fed to the glass fibre, the modulation means comprising control means for controlling the electrooptical converter in response to the electrical modulation signal, whereby an optical modulator is not necessary; and means for obtaining the electrical modulation signal by modulating a baseband signal on a subcarrier, whereby transmitted and received modulation signals are distinguishable in the IF section of the station.

6. The station of claim 5
wherein the optical coupling means retains polarization direction; and
further comprising polarization direction control means between the glass fibre and the optical coupling means, whereby no polarization direction control means is required in a second station coupled to the station via the glass fibre.

7. The station of claim 5 further comprising frequency control means for establishing the frequency of the light signal generated by the electrooptical converter on the basis of the frequency of the received light signal and a desired value of a differential frequency, whereby no frequency control means is required in a second station coupled to the station via the glass fibre.

8. The station of claim 5
a) wherein the optical coupling means retains polarization direction; and
b) further comprising
  i) polarization direction control means between the glass fibre and the optical coupling means, and
  ii) frequency control means for establishing the frequency of the light signal generated by the electrooptical converter on the basis of the frequency of the received light signal and a desired value of a differential frequency
whereby neither polarization direction control means nor frequency control means is required in a second station coupled to the station via the glass fibre.

* * * * *